United States Patent
Usami et al.

[11] Patent Number: 6,118,994
[45] Date of Patent: Sep. 12, 2000

[54] PORTABLE COMMUNICATIONS DEVICE CAPABLE OF AUTODIALING TRUNCATED RECEIVED TELEPHONE NUMBER

[75] Inventors: Toshio Usami; Kazuhiko Fujimori, both of Kanagawa, Japan

[73] Assignee: Matsushita Electric Industrial Co., Ltd., Osaka, Japan

[21] Appl. No.: 08/879,361

[22] Filed: Jun. 20, 1997

[30] Foreign Application Priority Data

Jun. 27, 1996 [JP] Japan ................................ 8-167874

[51] Int. Cl.7 ............................ H04Q 7/18; H04Q 7/14
[52] U.S. Cl. ...................... 455/412; 455/459; 340/311.1; 340/825.44
[58] Field of Search ................. 455/406, 31.2, 455/31.3, 460, 459, 564; 340/825.44, 311.1; 379/355

[56] References Cited

U.S. PATENT DOCUMENTS

| | | | |
|---|---|---|---|
| 5,054,051 | 10/1991 | Hoff | 455/556 |
| 5,280,516 | 1/1994 | Jang | 455/31.2 |
| 5,559,862 | 9/1996 | Bhagat et al. | 455/460 |
| 5,581,595 | 12/1996 | Iwashita et al. | 455/31.2 |
| 5,625,884 | 4/1997 | Gitlin et al. | 455/54.1 |
| 5,797,098 | 8/1998 | Schroder et al. | 455/464 |

*Primary Examiner*—Dwayne D. Bost
*Assistant Examiner*—Alan T. Gantt
*Attorney, Agent, or Firm*—Pearne, Gordon, McCoy & Granger LLP

[57] ABSTRACT

A processor extracts a numeral string from a pager message which has been received via a pager antenna and a pager-signal receiving unit, and retrieves a telephone number including that numeral from a built-in telephone directory memory. The retrieved telephone number is displayed on a display unit, making it possible to determine a complete telephone number.

6 Claims, 2 Drawing Sheets

PORTABLE COMMUNICATIONS DEVICE CAPABLE OF AUTODIALING TRUNCATED RECEIVED TELEPHONE NUMBER

BACKGROUND OF THE INVENTION

The present invention relates to a portable terminal which is capable of receiving a pager message.

Conventionally, in portable terminals of this type, measures are adopted so as to make it possible to confirm from whom a call is being made by extracting only a telephone number from a message through a simple operation when the message including a call destination sent from a calling party is received by a pager, to make it possible to autodial the extracted telephone number by single button dialing by means of a built-in dial tone generator, or to allow a phone call to be made by single button dialing from a built-in radiotelephone device.

However, with the above-described portable terminals, in a case where the telephone number in the message from the calling party is incomplete, e.g., in a case where an area code is missing, a connection cannot be established even if the telephone number is dialed as is. For this reason, there has been a drawback in that the user must complement the missing portion by some means or other, which is troublesome.

SUMMARY OF THE INVENTION

Accordingly, it is an object of the present invention to provide a portable terminal which is capable of complementing an incomplete portion of the telephone number by referring to an electronic telephone directory incorporated in the portable terminal, thereby overcoming the above-described drawback of the conventional art.

To this end, in the present invention, a numeral string is extracted from a pager message which has been received, and a telephone number including that numeral string is retrieved from an electronic telephone directory so as to display a complete telephone number as well as a name corresponding thereto. Accordingly, it is advantageous that an incomplete portion of the telephone number in the message can be complemented by referring to the electronic telephone directory incorporated in the portable terminal.

In accordance with a first aspect of the present invention, there is provided a portable terminal comprising: pager reception means for receiving a radio call signal including a message; storage means for storing telephone numbers as an electronic telephone directory; extracting means for extracting a numeral string from the pager message received by the pager reception means; retrieval means for retrieving from the storage means a telephone number included the numeral string extracted by the extracting means; and display means for displaying the telephone number retrieved by the retrieving means. Accordingly, even if the telephone number in the pager message is incomplete, it is possible to determine a complete telephone number.

In accordance with a second aspect of the present invention, the portable terminal further comprises: means for consecutively displaying a plurality of telephone numbers as candidates in a case where the plurality of telephone numbers are retrieved by the retrieving means. Accordingly, even if a plurality of candidates are present, the candidates can be retrieved consecutively, making it possible to determine an appropriate number.

In accordance with a third aspect of the present invention, the portable terminal further comprises: means for converting the telephone number displayed on the display means into a dial tone. Accordingly, the retrieved complete telephone number can be autodialed.

In accordance with a fourth aspect of the present invention, the portable terminal further comprises: a radiotelephone for dialing the telephone number displayed on the display means and for engaging in a telephone communication. Accordingly, a radiotelephone call can be made to the retrieved complete telephone number.

DESCRIPTION OF THE PREFERRED EMBODIMENTS

Referring now to the accompanying drawings, a description will be given of the preferred embodiments of the present invention.

First Embodiment

Figure 1:
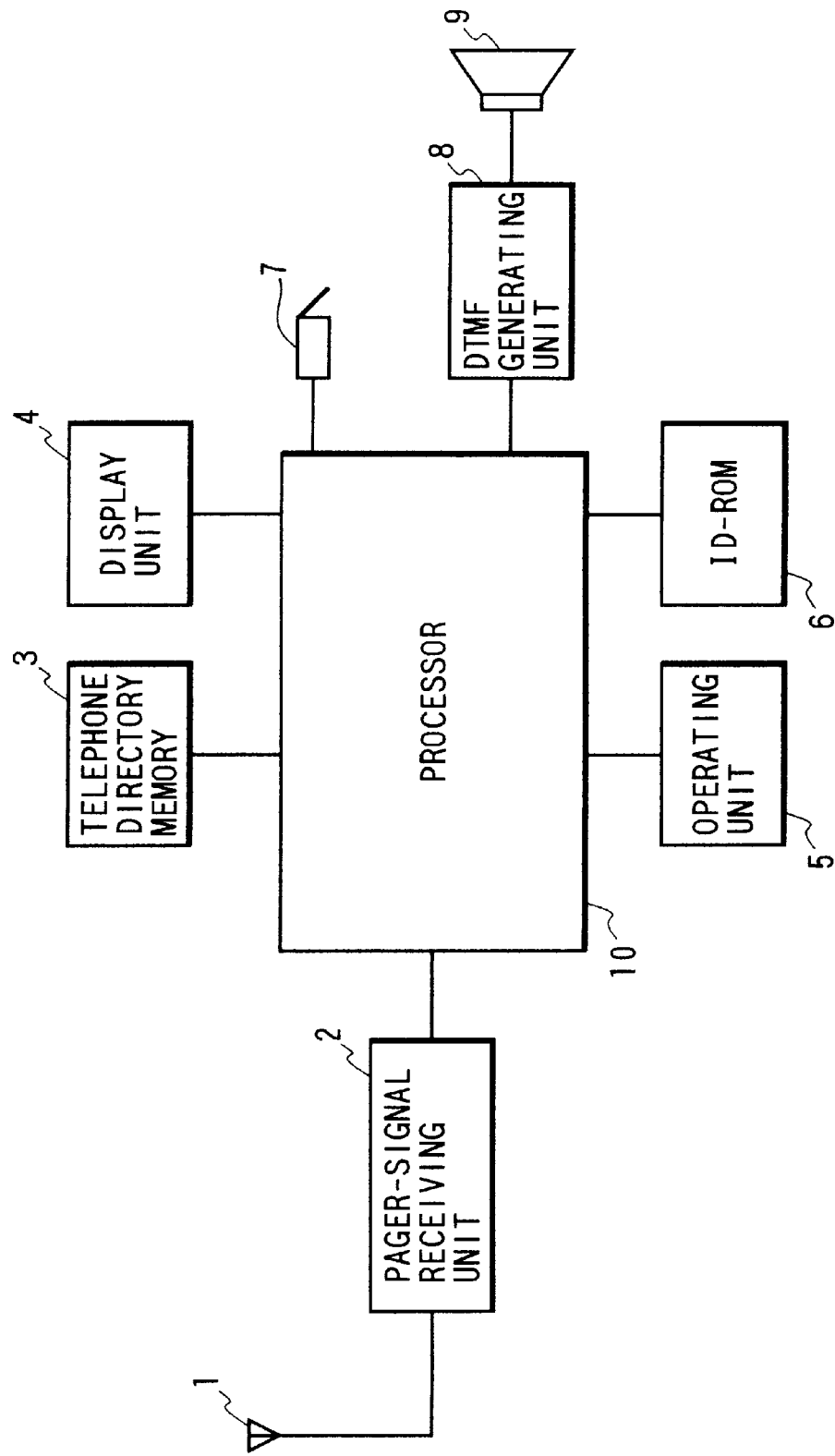
FIG. 1 is a block diagram illustrating the configuration of a portable terminal in accordance with a first embodiment of the present invention.

FIG. 1 shows a block diagram of a portable terminal in accordance with a first embodiment of the present invention. In FIG. 1, reference numeral 1 denotes an antenna for receiving pager signals; 2, a pager-signal receiving unit; 3, a telephone directory memory for storing telephone numbers as an electronic telephone directory; 4, a display unit; 5, an operating unit; 6, an ID-ROM for storing an individual number of a pager; 7, a buzzer for notifying a user of pager reception; 8, a dual-tone multifrequency (DTMF) generating unit for generating a dial tone; 9, a speaker for generating the dial tone generated by the DTMF generating unit 8; and 10, a processor for controlling the overall operation of the equipment.

A description will be given of the operation of the portable terminal configured as described above. When pager signals including a message are received by the antenna 1 and the receiving unit 2, the processor 10 compares a signal representing the individual number of a pager with the individual number of the pager stored in the ID-ROM 6, and if they coincide with each other, the message and the fact that there has been reception are displayed on the display unit 4, and a notification sound is generated by the buzzer 7 for notifying the user that there has been reception. At this time, the message may be, for example, "Call 123-4567." In terms of its contents, the message means that the calling party wants the receiving party to call the calling party at 123-4567. In this example, however, the telephone number which has been received as the message is incomplete since the area code is missing. Here, the user starts retrieval by operating the operating unit 5 in the state in which the message is being displayed. Upon receipt of this starting request, the processor 10 first extracts the numeral string "1234567" in the example of the aforementioned message. Then, the processor 10 retrieves a telephone number including the extracted numeral string "1234567" from the telephone directory memory 3. If a candidate is found, the processor 10 displays the telephone number found together with the name on the display unit 4. In the above example, the result of retrieval is displayed as "office 0451234567." By confirming this display, the user is able to confirm a correct complete telephone number together with the name of the calling party.

In addition, if a plurality of candidates are found as a result of retrieval, the user is able to have the candidates displayed consecutively by operating the operating unit 5, and is able to determine a most appropriate number among them after considering the situation and the like.

Further, in a case where an autodialing function is mounted, if the operating unit 5 is operated in the state in which the correct telephone number is being displayed, the DTMF generating unit 8 converts the telephone number into a DTMF tone and generates the tone through the speaker. Hence, autodialing can be effected by allowing the speaker 9 to be applied to the mouthpiece of a public telephone or the like.

Second Embodiment

Figure 2:
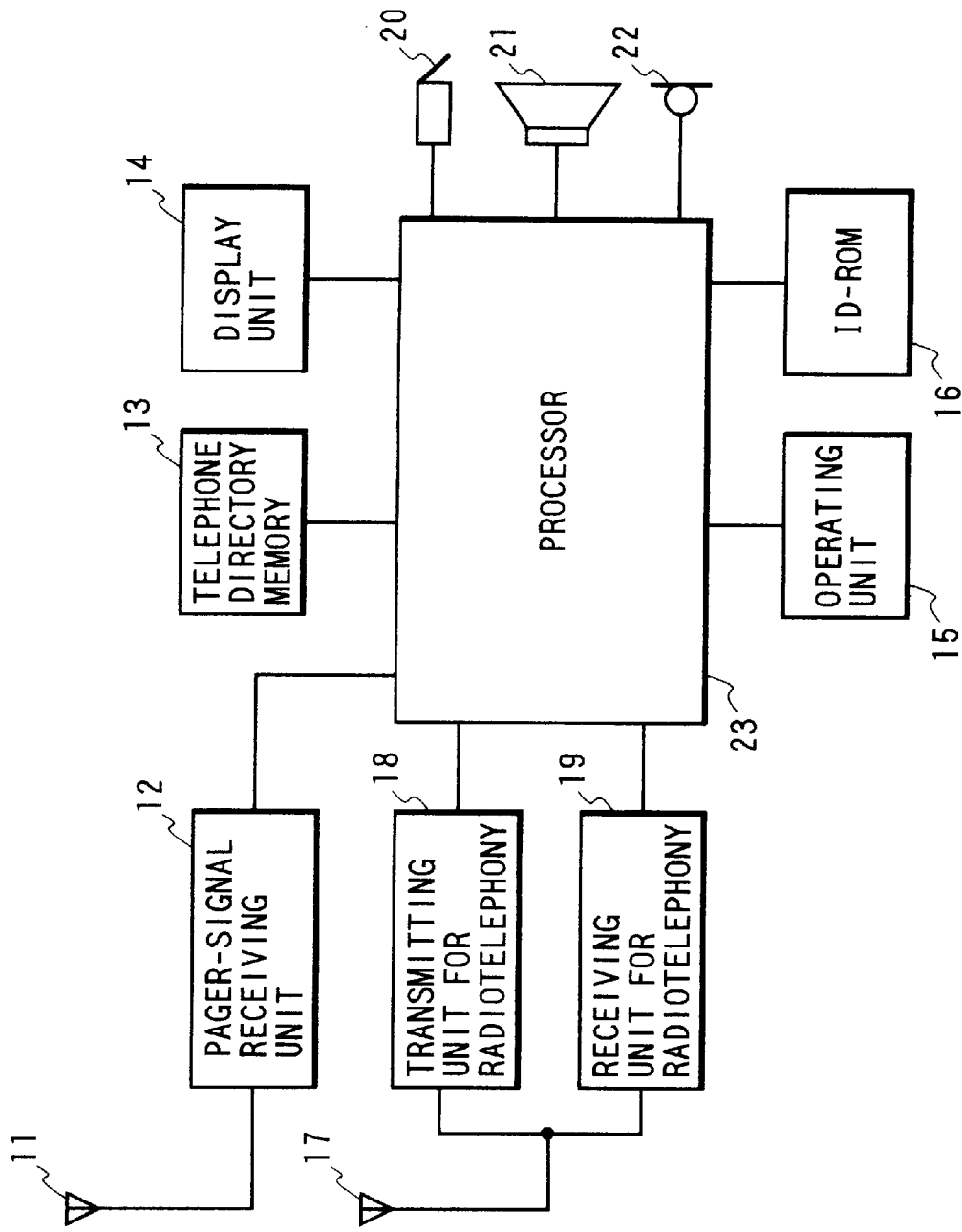
FIG. 2 is a block diagram illustrating the configuration of a portable terminal in accordance with a second embodiment of the present invention.

FIG. 2 shows a block diagram of a portable terminal in accordance with a second embodiment of the present invention. In FIG. 2, reference numeral 11 denotes an antenna for receiving pager signals; 12, a pager-signal receiving unit; 13, a telephone directory memory for storing telephone numbers as an electronic telephone directory; 14, a display unit; 15, an operating unit; 16, an ID-ROM for storing an individual number of a pager and an individual number of a radiotelephone; 17, an antenna for radiotelephony; 18, a transmitting unit for radiotelephony; 19, a receiving unit for radiotelephony; 20, a buzzer for notifying a user of pager reception and an incoming call of radiotelephony; 21, a telephone receiver; 22, a telephone transmitter; and 23, a processor for controlling the overall operation of the equipment.

A description will be given of the operation of the portable terminal configured as described above. When pager signals including a message are received by the antenna 11 and the receiving unit 12, the processor 23 compares a signal representing the individual number of a pager with the individual number of the pager stored in the ID-ROM 16, and if they coincide with each other, the message and the fact that there has been reception are displayed on the display unit 14, and a notification sound is generated by the buzzer 20 for notifying the user that there has been reception. At this time, the message may be, for example, "Call 4567." In this example as well, the telephone number which has been received as the message is incomplete. Here, the user starts retrieval by operating the operating unit 15 in the state in which the message is being displayed. Upon receipt of this starting request, the processor 23 first extracts the numeral string "4567" in the example of the aforementioned message. Then, the processor 23 retrieves a telephone number including the extracted numeral string "4567" from the telephone directory memory 13. If a candidate is found, the processor 23 displays the telephone number found together with the name on the display unit 14. At this time, if a plurality of candidates are found, e.g., if a candidate "office 0451234567" and a candidate "home 0399994567" are found, the user is able to have the candidates displayed consecutively by operating the operating unit 15, and is able to determine the other party to contact, after considering, among others, the situation in which the pager message has been received. After the telephone number which has been selected as a result of the determination is displayed, if the operating unit 15 is operated, radiotelephony can be effected through the transmitting unit 18, the receiving unit 19, and the antenna 17 for radiotelephony, as well as the telephone receiver 21 and the telephone transmitter 22.

As described above, in accordance with the present invention, a numeral string is extracted from a pager message which has been received, and a telephone number including that numeral string is retrieved from the built-in electronic telephone directory so as to display a complete telephone number. Accordingly, it is possible to obtain an advantage in that even if the telephone number in the message is incomplete, the incomplete portion can be complemented by referring to the built-in electronic telephone directory.

What is claimed is:

1. A portable terminal comprising:

pager reception means for receiving a radio call signal including a pager message;

storage means for storing telephone numbers as an electronic telephone directory;

extracting means for extracting a numeral string from the pager message received by said pager reception means;

retrieval means for retrieving from said storage means a telephone number that includes the numeral string extracted by said extracting means; and display means for displaying the telephone number retrieved by said retrieving means, wherein said display means is operable to display a plurality of telephone numbers as candidates in a case where the plurality of telephone numbers are retrieved by said retrieval means.

2. A portable terminal according to claim 1, wherein said plurality of telephone numbers are displayed consecutively.

3. A portable terminal according to claim 1, further comprising:

means for converting the telephone number displayed on said display means into a dial tone.

4. A portable terminal according to claim 1, further comprising:

a radiotelephone for dialing the telephone number displayed on said display means and for engaging in a telephone communication.

5. A portable terminal according to claim 2, further comprising:

means for converting the telephone number displayed on said display means into a dial tone.

6. A portable terminal according to claim 2, further comprising:

a radiotelephone for dialing the telephone number displayed on said display means and for engaging in a telephone communication.

* * * * *